United States Patent
Little et al.

(10) Patent No.: US 7,169,108 B2
(45) Date of Patent: Jan. 30, 2007

(54) CW BEAM FORMER IN AN ASIC

(75) Inventors: Blake Little, Bothell, WA (US); Hung Nguyen, Everett, WA (US)

(73) Assignee: SonoSite, Inc., Bothell, WA (US)

( * ) Notice: Subject to any disclaimer, the term of this patent is extended or adjusted under 35 U.S.C. 154(b) by 0 days.

(21) Appl. No.: 10/656,901

(22) Filed: Sep. 5, 2003

(65) Prior Publication Data

US 2004/0133110 A1 Jul. 8, 2004

Related U.S. Application Data

(63) Continuation of application No. 10/358,113, filed on Feb. 3, 2003, now Pat. No. 6,648,826.

(60) Provisional application No. 60/353,385, filed on Feb. 1, 2002.

(51) Int. Cl.
*A61B 8/14* (2006.01)

(52) U.S. Cl. .................................................. 600/457

(58) Field of Classification Search ................ 600/457, 600/437, 455, 454, 453, 441–442, 456, 523; 73/861.25
See application file for complete search history.

(56) References Cited

U.S. PATENT DOCUMENTS

| | | | |
|---|---|---|---|
| 5,115,435 A * | 5/1992 | Langford et al. ............ 714/727 |
| 5,495,422 A * | 2/1996 | Olson .......................... 716/21 |
| 5,628,321 A * | 5/1997 | Scheib et al. ................ 600/453 |
| 5,647,366 A | 7/1997 | Weng | |
| 5,722,412 A * | 3/1998 | Pflugrath et al. ........... 600/459 |
| 5,839,442 A | 11/1998 | Chaing et al. | |
| 5,876,341 A * | 3/1999 | Wang et al. ................. 600/441 |
| 5,893,363 A | 4/1999 | Little et al. | |
| 5,935,074 A | 8/1999 | Mo et al. | |
| 6,048,319 A | 4/2000 | Hudgins et al. | |
| 6,126,601 A * | 10/2000 | Gilling ........................ 600/440 |
| 6,126,608 A | 10/2000 | Kemme et al. | |

(Continued)

FOREIGN PATENT DOCUMENTS

DE 2003/10224234 1/2003

(Continued)

*Primary Examiner*—Francis J. Jaworski
(74) *Attorney, Agent, or Firm*—Fulbright & Jaworski LLP

(57) ABSTRACT

The present invention relates to a continuous wave Doppler beam former application specific integrated circuit (CW-ASIC). The beam former may be a transmit or receive beam former. In one mode the CW-ASIC applies to a continuous wave Doppler beam former application specific integrated circuit for use in a diagnostic medical ultrasound system comprising a plurality of channels forming a CW analog receive path wherein each channel is connected with a digital beam former, the plurality of channels are mixed down in quadrature to base band using a mixer and a local oscillator (LO) generated in quadrature, the outputs of said mixer are summed and wall/high pass filtered to provide a beam formed base band signal, and a sub circuit providing a digital serial control function to interface to a real time control bus providing per channel enable/disable of said mixer and said local oscillator generator, and local oscillator delay as well as global local oscillator frequency select, said digital serial control also having an external delay enable signal to start said LO generators and synchronize all the internal LO delays. The beam former on an ASIC also includes a ultrasound system on a ASIC.

4 Claims, 5 Drawing Sheets

U.S. PATENT DOCUMENTS

| | | |
|---|---|---|
| 6,203,498 B1 | 3/2001 | Bunce et al. |
| 6,248,073 B1 | 6/2001 | Gilbert et al. |
| 6,251,073 B1 | 6/2001 | Imran et al. |
| 6,312,381 B1* | 11/2001 | Knell et al. ............ 600/437 |
| 6,416,475 B1 | 7/2002 | Hwang et al. |
| 6,436,039 B1* | 8/2002 | Lannutti et al. ............ 600/437 |
| 6,488,625 B1* | 12/2002 | Randall et al. ............ 600/437 |
| 6,508,763 B1* | 1/2003 | Urbano et al. ............ 600/437 |
| 6,527,722 B1* | 3/2003 | Fazioli et al. ............ 600/457 |
| 6,561,979 B1* | 5/2003 | Wood et al. ............ 600/437 |
| 6,569,101 B2* | 5/2003 | Quistgaard et al. ......... 600/459 |
| 6,618,206 B2 | 9/2003 | Tarakci et al. |
| 6,648,826 B2* | 11/2003 | Little et al. ............ 600/457 |
| 6,663,567 B2 | 12/2003 | Ji et al. |
| 6,685,645 B1 | 2/2004 | McLaughlin et al. |
| 6,733,455 B2 | 5/2004 | Mo et al. |
| 6,773,399 B2 | 8/2004 | Xi et al. |
| 6,866,631 B2 | 3/2005 | McLaughlin et al. |
| 6,866,632 B1 | 3/2005 | Chou et al. |
| 6,896,658 B2 | 5/2005 | Ji et al. |
| 6,936,008 B2 | 8/2005 | Tarakci et al. |
| 6,980,419 B2 | 12/2005 | Smith et al. |
| 2003/0004414 A1 | 1/2003 | McLaughlin et al. |
| 2003/0009102 A1* | 1/2003 | Quistgaard et al. ......... 600/446 |
| 2005/0131294 A1 | 6/2005 | Ji et al. |

FOREIGN PATENT DOCUMENTS

| | | |
|---|---|---|
| WO | WO 2004/080364 | 9/2004 |

* cited by examiner

CW BEAM FORMER IN AN ASIC

CROSS-REFERENCES TO RELATED APPLICATIONS

This application is a continuation of application Ser. No. 10/358,113 filed Feb. 3, 2003, now U.S. Pat. No. 6,648,826 which claimed the benefit of U.S. Provisional Patent Application No. 60/353,385, filed on Feb. 1, 2002, the full disclosures of which are incorporated herein by reference. This application also contains subject matter related to pending non-provisional applications Ser. No. 09/840,002, filed on Apr. 19, 2001, and Ser. No. 10/062,179 , filed on Feb. 1, 2002, the full disclosures of which are incorporated herein by reference.

BACKGROUND OF THE INVENTION

The present invention relates to a beamformer for CW Doppler ultrasound that has been reduced to a single application specific integrated circuit. The reduction of a CW Beamformer to an ASIC chip provides considerable savings in space and power consumption in the use of a medial ultrasound device.

The present invention relates to a beamformer for CW Doppler ultrasound that has been reduced to a single application specific integrated circuit. The reduction of a CW Beamformer to an ASIC chip provides considerable savings in space and power consumption in the use of a medial ultrasound device.

BRIEF SUMMARY OF THE INVENTION

The present invention relates to a continuous wave Doppler beam former application specific integrated circuit (CW-ASIC). The beam former element may be either a receive beam former, or a transmit beam former.

More specifically, the CW-ASIC is a receive beam former comprising a local oscillator generator having a programmable delay function and a programmable frequency function and capable of producing a LO I signal and a LO Q signal (LO I/Q pair), said LO I/Q pair being multiplied with an analog receive signal to produce a complex base band output. The CW-ASIC may further comprise a plurality of local oscillator generators. The receive beam former further comprising a sum circuit for the summation of the base band signals produced by said plurality of local oscillator generators, said sum circuit further comprising a filter to produce a base band beam formed signal.

The CW-ASIC transmit beam former comprises a plurality of transmit circuits, wave form generation circuits and delay circuits to generate an acoustic transmit beam Another embodiment of the present invention provides for a continuous wave Doppler beam former application specific integrated circuit for use in a diagnostic medical ultrasound system, the continuous wave Doppler beam former application specific integrated circuit comprising a plurality of channels forming a CW analog receive path wherein each channel is connected with a digital beam former, the plurality of channels are mixed down in quadrature to base band using a mixer and a local oscillator (LO) generated in quadrature, the outputs of said mixer are summed and wall/high pass filtered to provide a beam formed base band signal; and a sub circuit which provides a digital serial control function to interface to a real time control bus providing per channel enable/disable of said mixer and said local oscillator generator, and local oscillator delay as well as global local oscillator frequency select, said digital control also having an external delay enable signal to start said LO generators and synchronize all the internal LO delays.

A third embodiment of the present invention comprises an ultrasound system application specific integrated circuit (US-ASIC) having at least one beam former, a transducer controller, one or more digital signal processor(s), and a plurality of input/output channels for linking to at least one memory means, a power control system, a transducer and a user interface.

DETAILED DESCRIPTION OF THE INVENTION

The present invention relates generally to a continuous wave Doppler beam former on an application specific integrated circuit (CW-ASIC). Classically, a beam former consists of a pulser, pulse delays, a transmit/receive (T/R) switch, amplifiers, analog-to-digital converters, echo delays, and a summer. The beam former of this classical design can further be broken down into a transmit beam former (those processes necessary to make a transducer emit a continuous pulse) and a receive beam former (processes necessary for interpreting the received echo into a Doppler data stream). The use of a single ASIC to operate as the beam former for a continuous wave ultrasound device, either on the transmit side or receive side, marks for a significant reduction in power and real estate needed in the operation of the ultrasound device.

Figure 1:
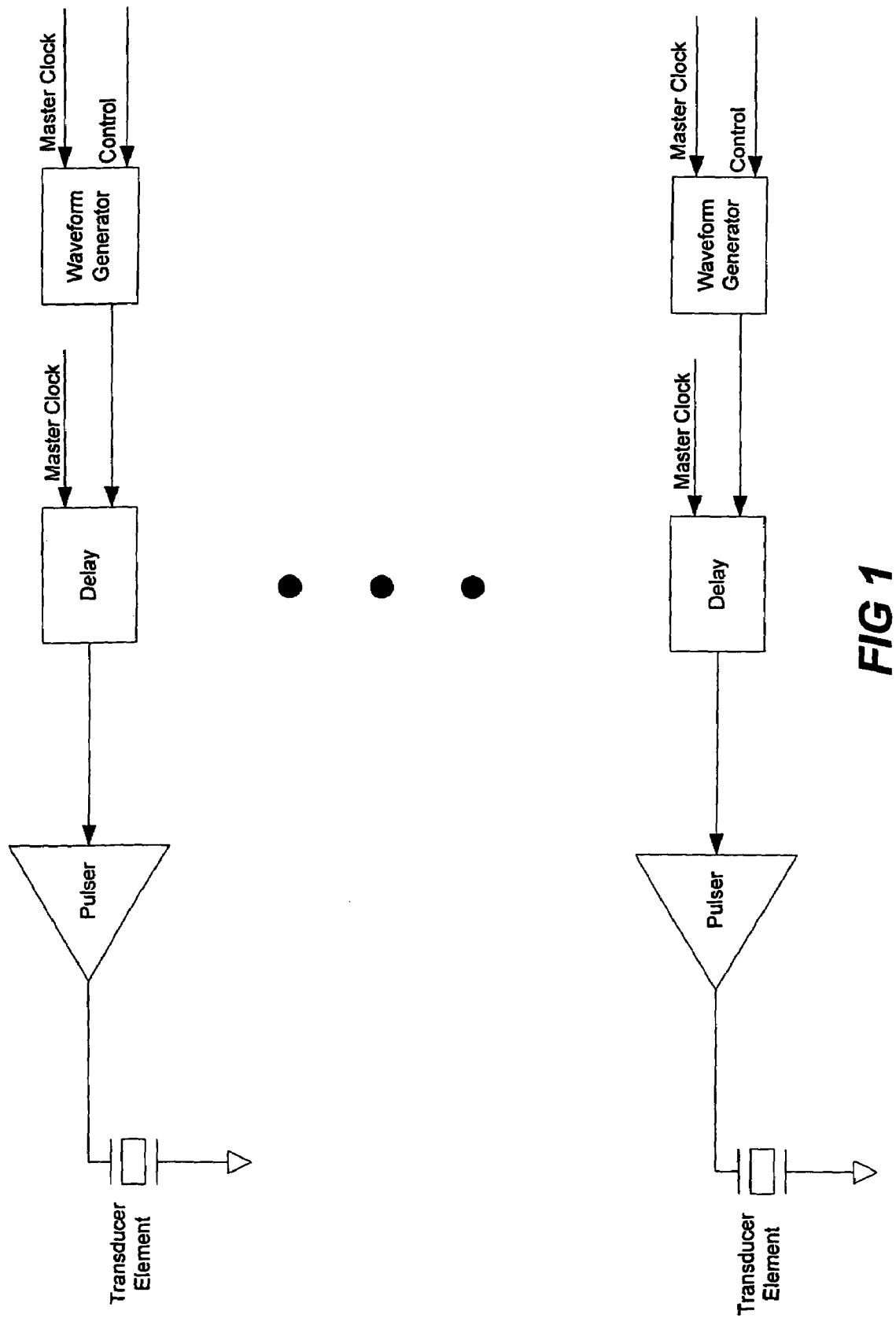
FIG. 1 illustrate a flow diagram of a transmit beam former CW-ASIC.

Turning now to the drawings, FIG. 1 illustrates a basic diagram of the components necessary to create a transmit beam former ASIC 100. The ASIC has a plurality of transmit circuits 102, wave form generation circuits 104 and delay circuits 106. The operation of the individual elements is similar to a transmit and timing control circuit for a T/R device. The wave form generator 104 creates a wave pattern to be used in the excitation of the transducer elements 110. The firing of the wave forms depends on the delay and the transmit circuit 102. Because CW Doppler requires continuous transmission by a number of elements, the delay in the firing of elements 110 is zero, and the transmit circuit 102 is constantly sending the wave form generated by the wave form generator 104. Where the beam former is used for a pulse type scan mode, such as pulse wave Doppler, B mode (brightness) or M mode, the delay circuit would be utilized more to cause the transmit circuit to fire at a particular frequency.

Figure 2:
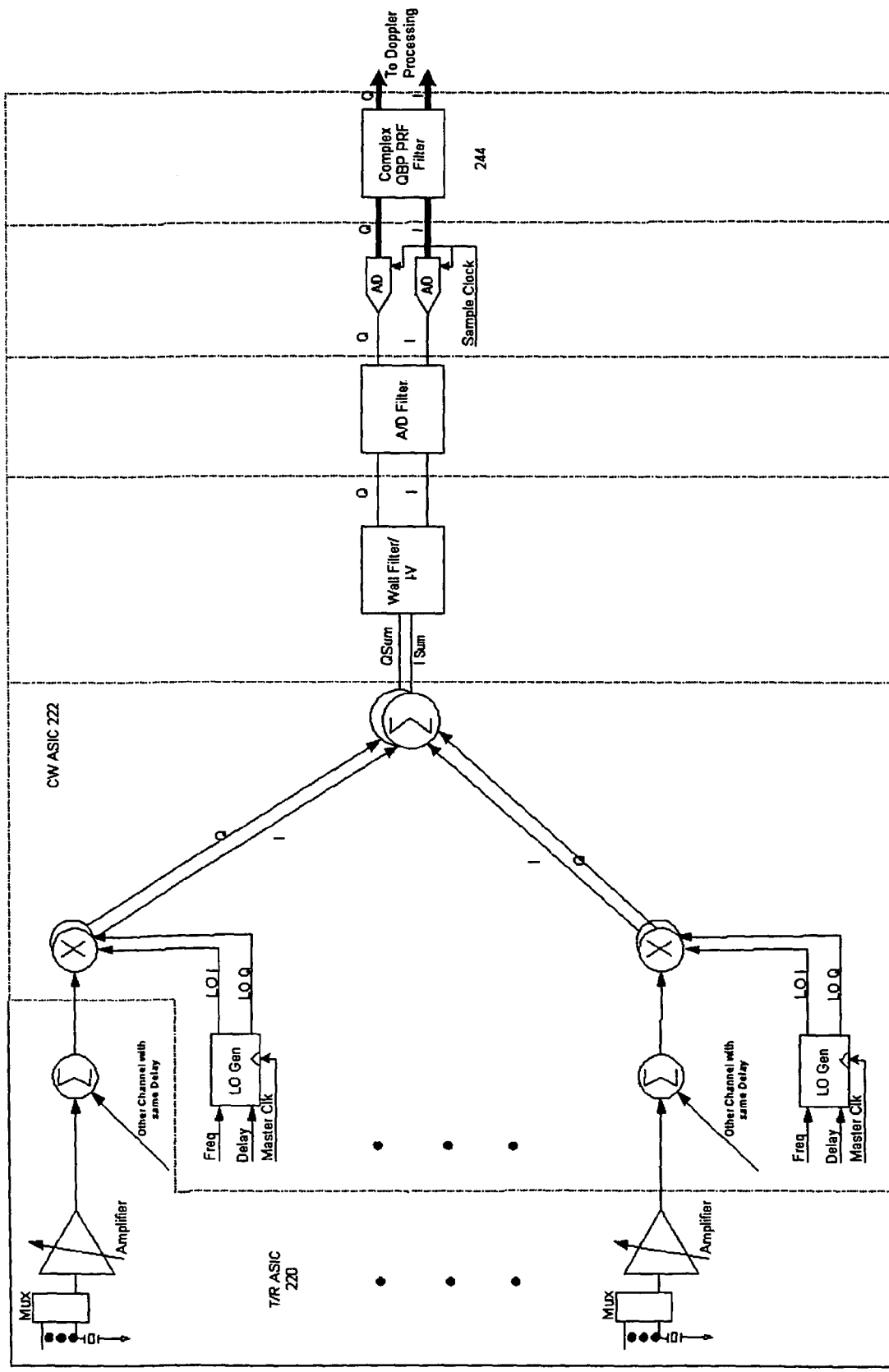
FIG. 2 illustrates a flow diagram of a receive beam former CW-ASIC.

FIG. 2 illustrates a logic pathway for a continuous wave Doppler receive beam former.

The T/R circuit is shown on the left. The individual receive channels of the transducer are either processed through a T/R circuit (as shown) or sent directly to the CW-ASIC 222 beam former. The more efficient solution, offering enhanced miniaturization and power reduction is for the elements of the transducer that are in the same phase to be summed in the T/R circuit prior to coming into the CW-ASIC (of course the T/R circuit can be incorporated into the CW-ASIC 222 within the borders of the large box.) Once the receive signals of the same phase or timing are summed, the number of input channels is reduced, allowing for a smaller data band width to be handled by the CW-ASIC.

The incoming signal channels may be either analog or digital. The receive channels are applied to a multiplier where they are multiplied with a signal generated by a local oscillator generator. The local oscillator generator (LO GEN) comprises a programmable delay function and a programmable frequency function and is capable of producing a LO I signal and a LO Q signal (LO I/Q pair). The LO I/Q pair being multiplied with the analog receive signal to produce a complex base band output. The receive beam former may further comprise a sum circuit for the summation of the base band signals produced by the plurality of local oscillator generators, said sum circuit further comprising a filter to produce a base band beam formed signal. Arguably this is the end of the receive beam former requirements and the CW-ASIC need not incorporate any additional circuitry.

However the use of ASIC technology and having a CW receive beam former makes the ASIC a logical platform to include any one of several additional processes including wall filtering, analog to digital conversion, additional A/D conversion on the I/Q Doppler data, and complex quadrature band pass PRF frequency filtering. The inclusion of each additional circuit is shown in the progressive dashed lines going from left to right in the incorporated drawing above.

Figure 3:
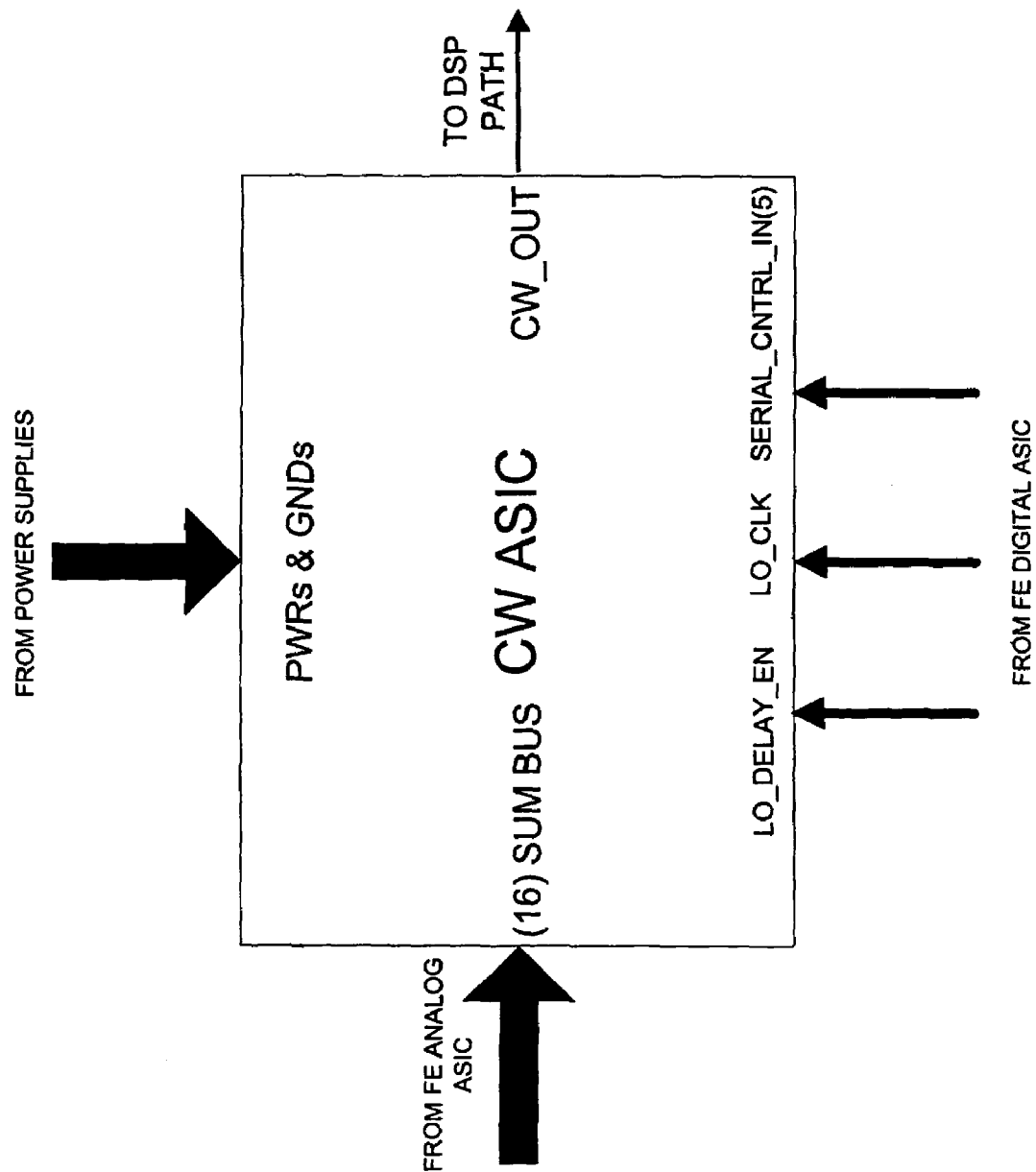
FIG. 3 illustrates a top level block diagram of a CW-ASIC.

FIG. 3 illustrates a top level block diagram of the CW-ASIC 222.

The top level diagram includes the minimum receive circuitry. The particular advantage to having the CW-ASIC beam former is it allows those who design ultrasound systems to move the CW-ASIC to a variety of logical locations with in an architecture, so the I/O ports of the CW-ASIC may more efficiently be coupled to data inputs, memory elements and power. This allows the CW-ASIC to take advantage of elements in the system architecture that can provide input data more efficiently than the CW-ASIC can itself produce, as well as shorted the distance between components the CW-ASIC needs to communicate with. Shorter distance means less signal loss, and lower power consumption.

Figure 4:
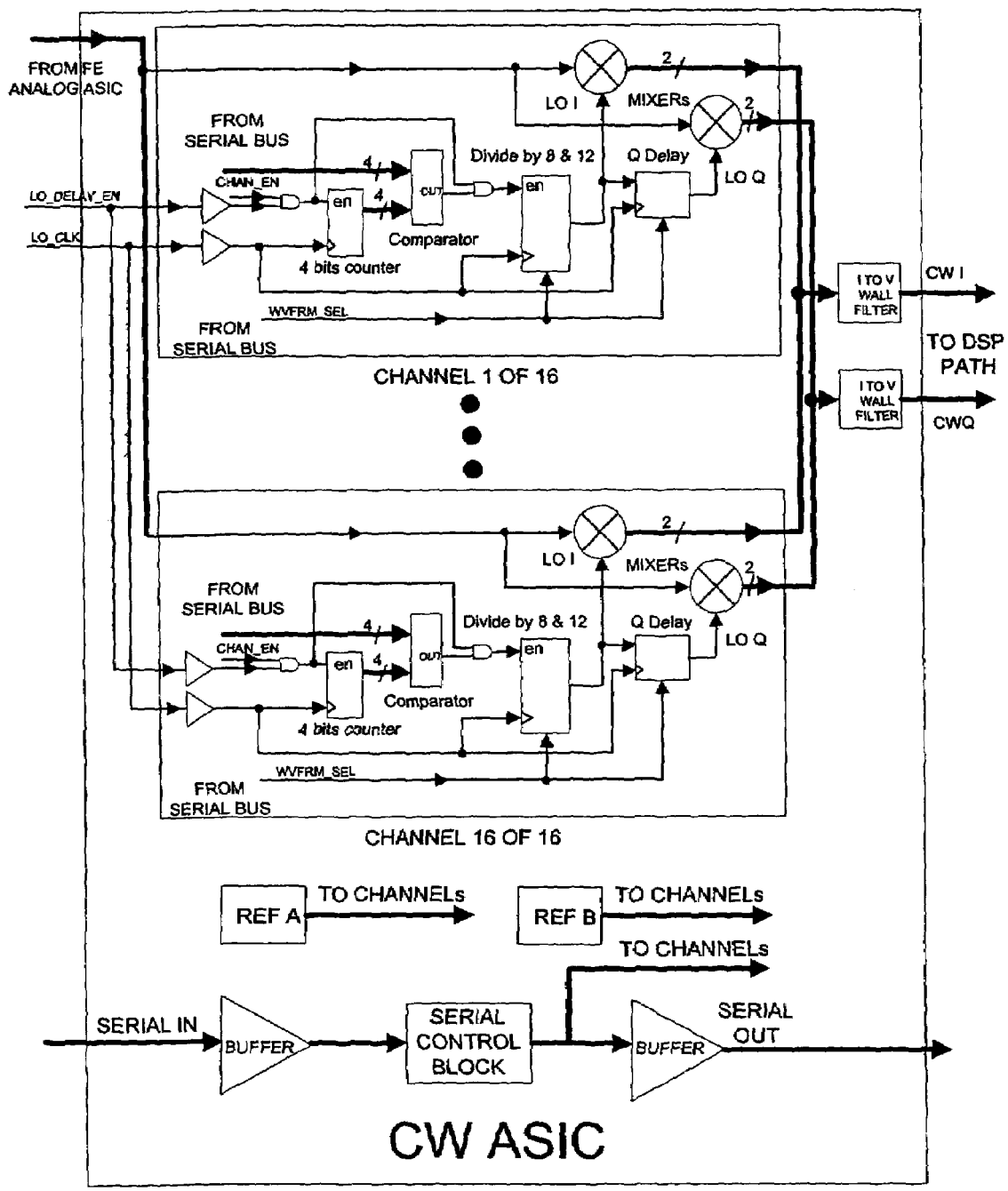
FIG. 4 illustrates a detailed block diagram of a CW-ASIC.

FIG. 4 illustrates a detailed drawing of the CW-ASIC of the present invention. The details of the diagram are clearly labeled for within the schematic.

Figure 5:
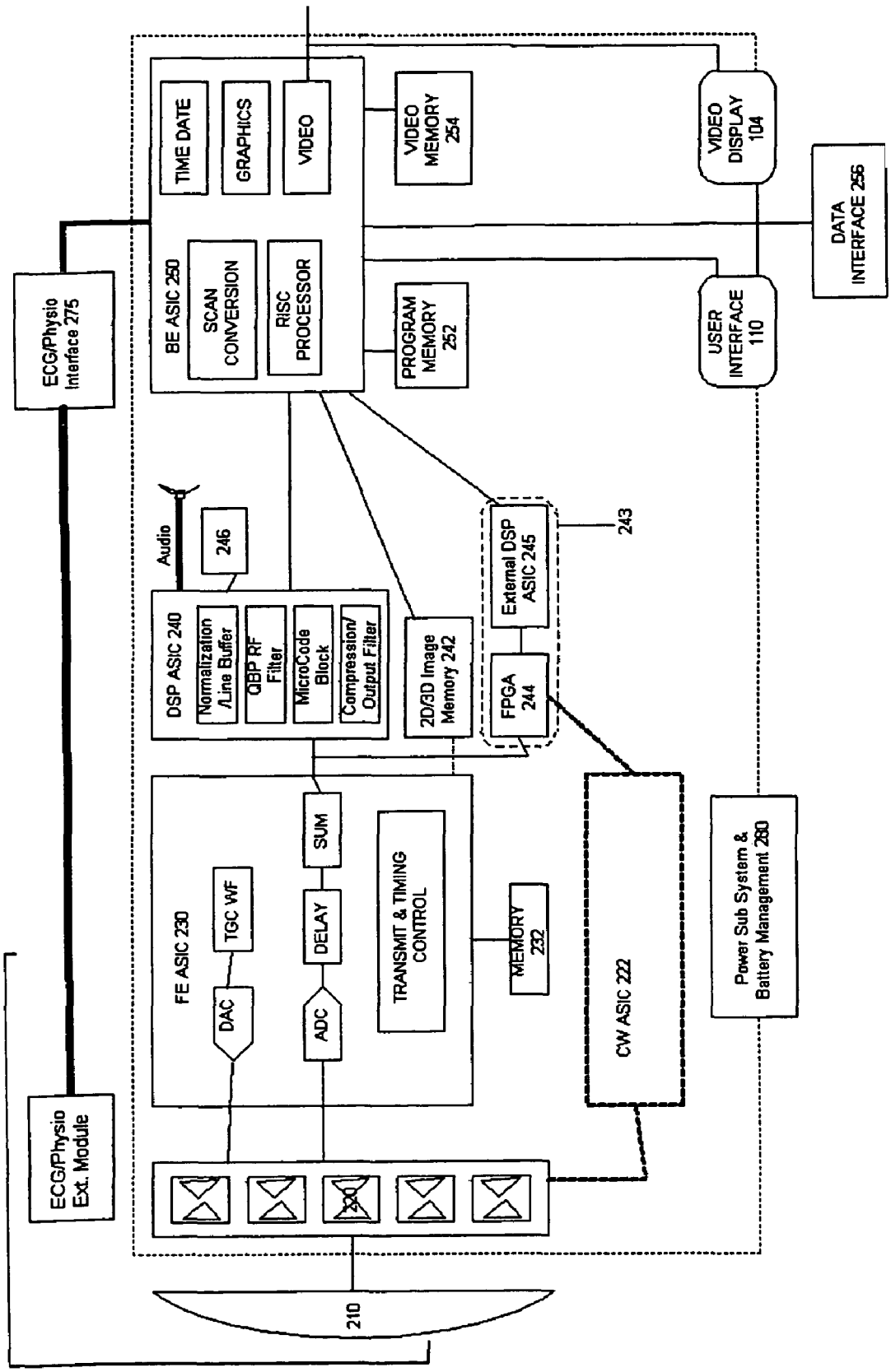
FIG. 5 illustrates a flow diagram of a US-ASIC.

FIG. 5 illustrates a US-ASIC, an ultrasound system on an ASIC. The intent here is to show that any of the processes previously reduced to an ASIC can be combined into a single ASIC permitting the ultimate in power and real estate savings. The use of a CW-ASIC 222 is shown in heavy dotted lines. However the vast majority of processes for the ultrasound instrument illustrated in FIG. 5 are reduced to various ASIC devices already. We have noted the combination of ASIC elements in separate ASIC chips leads to further space and power savings. For instance the combination of a transmit and receive beam former illustrated separately as CW-ASIC 222 and FE ASIC 230 are a combination allowing circuits to draw from a single master clock path for precise timing and single system input channel for a shared feature. Additionally where analog to digital and digital to analog filters are used, data can be routed from the digital beam former of the FE ASIC 230 and the Doppler data path in 243 (path not shown) into a common A/D converter in CW-ASIC 222. As functional elements are included on a single die and routing between ASIC elements is converted to routing on a single ASIC, the advantage of space an power savings are realized. Existing ASIC elements are generally low power, allowing the circuit integration of ASICS without concerns of signal noise generated between high and low voltage areas. The use of analog and digital signals on the same die affords some noise problems, however we have demonstrated in a co-pending application the ability to provide mix modes on a single die without degradation of signal and performance.

Logically the US-ASIC does not include those elements not conducive to inclusion on a single die, such as the various memory elements which include look up tables and data libraries, as well as memory buffers for large files (such as a Doppler scan with spectral analysis and ECG data over lay). Similarly data for video display 104 and video memory 254 would remain separate.

FIG. 5 illustrates a US-ASIC, an ultrasound system on an ASIC. The intent here is to show that any of the processes previously reduced to an ASIC can be combined into a single ASIC permitting the ultimate in power and real estate savings. The use of a CW-ASIC 222 is shown in heavy dotted lines. However the vast majority of processes for the ultrasound instrument illustrated in FIG. 5 are reduced to various ASIC devices already. We have noted the combination of ASIC elements in separate ASIC chips leads to further space and power savings. For instance the combination of a transmit and receive beam former illustrated separately as CW-ASIC 222 and FE ASIC 230 are a combination allowing circuits to draw from a single master clock path for precise timing and single system input channel for a shared feature. Additionally where analog to digital and digital to analog filters are used, data can be routed from the digital beam former of the FE ASIC 230 and the Doppler data path in 243 (path not shown) into a common A/D converter in CW-ASIC 222. As functional elements are included on a single die and routing between ASIC elements is converted to routing on a single ASIC, the advantage of space an power savings are realized. Existing ASIC elements are generally low power, allowing the circuit integration of ASICS without concerns of signal noise generated between high and low voltage areas. The use of analog and digital signals on the same die affords some noise problems, however we have demonstrated in a co-pending application the ability to provide mix modes on a single die without degradation of signal and performance.

Logically the US-ASIC does not include those elements not conducive to inclusion on a single die, such as the various memory elements which include look up tables and data libraries, as well as memory buffers for large files (such as a Doppler scan with spectral analysis and ECG data over lay). Similarly data for video display 104 and video memory 254 would remain separate.

Numerous alterations and modifications to the disclosure can be made without deviating from the true spirit of the present invention, which should be interpreted in light of the appended claims.

What is claimed is:

1. An ultrasound system application specific integrated circuit (US-ASIC) having at least one beam former, a transducer controller, one or more digital signal processor(s), and a plurality of input/output channels for linking to at least one memory means, a power control system, a transducer and a user interface.

2. The US-ASIC of claim 1, wherein said at least one beam former comprises:
a transmit beam former and a receive beam former.

3. The US-ASIC of claim 2, wherein said transmit beam former and said receive beam former draw from a single master clock path for precise timing.

4. The US-ASIC of claim 1, further comprising: analog to digital and digital to analog converters.

* * * * *